`US005493399A`

United States Patent [19]
Meyer et al.

[11] Patent Number: 5,493,399
[45] Date of Patent: Feb. 20, 1996

[54] POSITION MEASURING SYSTEM WITH COMPENSATION FOR VARIABLE DISTANCE BETWEEN LIGHT SOURCE AND INDEX DISK

[75] Inventors: Hermann Meyer, Weissbach; Sebastian Brandl, Altenmarkt, both of Germany

[73] Assignee: Johannes Heidenhain GmbH, Traunreut, Germany

[21] Appl. No.: 275,975

[22] Filed: Jul. 15, 1994

[30] Foreign Application Priority Data

Jul. 17, 1993 [EP] European Pat. Off. .............. 93111500

[51] Int. Cl.⁶ .................................................. G01B 11/14
[52] U.S. Cl. ........................................ 356/373; 250/237 G
[58] Field of Search ........................ 356/373; 250/237 G, 250/231.16, 231.17; 33/707

[56] References Cited

U.S. PATENT DOCUMENTS

| | | | |
|---|---|---|---|
| 3,400,275 | 9/1968 | Trump | 250/231.16 |
| 4,064,504 | 12/1977 | Lepefit et al. | 250/231.16 |
| 4,156,137 | 5/1979 | Nelle | 250/237 R |
| 4,263,506 | 4/1981 | Epstein | 250/237 G |
| 4,266,125 | 5/1981 | Epstein et al. | 250/231.17 |
| 4,795,901 | 1/1989 | Kitazawa | 250/237 G |
| 5,099,583 | 3/1992 | Heinz et al. | 250/237 G |
| 5,276,323 | 1/1994 | Nakaho | 250/237 G |

FOREIGN PATENT DOCUMENTS

| | | |
|---|---|---|
| 0418211 | 3/1991 | European Pat. Off. . |
| 2510273 | 9/1976 | Germany . |
| 2900295 | 7/1980 | Germany . |
| 02126114 | 5/1990 | Japan ............ 250/231.16 |
| 2246431 | 1/1992 | United Kingdom . |

*Primary Examiner*—Frank Gonzalez
*Assistant Examiner*—Jason D. Eisenberg
*Attorney, Agent, or Firm*—Willian Brinks Hofer Gilson & Lione

[57] ABSTRACT

A position measuring system with compensation for variable distance between the light source and the index disk. The index disk has a plurality of index lines separated by masked areas. The light source emits beams of light that impinge upon the plane of the index disk at an angle and yet are parallel to the direction of the index lines. The masked areas on the index disk along with the light source positioned at an angle with respect to the axis of the index disk allow the detectors located downstream of the index disk to be maximally illuminated when the index disk is located at its maximum permissible distance from the light source and the detectors are minimally illuminated when the index disk is located at its minimum permissible distance from the light source.

14 Claims, 5 Drawing Sheets

POSITION MEASURING SYSTEM WITH COMPENSATION FOR VARIABLE DISTANCE BETWEEN LIGHT SOURCE AND INDEX DISK

FIELD OF THE INVENTION

The invention relates to a measuring system with several gratings which can be displaced in the measuring direction with relation to each other. The gratings are embodied as a scanning grating and a scale grating. Light coming from a light source and passing parallel to the course of the grating lines and obliquely to the index planes of the gratings is modulated by the scale grating. The modulation of the intensity of the light is converted by at least one downstream located detector into electrical signals which are phase-shifted with respect to each other. The length of the grating lines of the scale grating is limited by a mask in such a way that the detector is maximally illuminated when the index planes of the gratings are at the maximally permissible distance from each other.

BACKGROUND OF THE INVENTION

German Patent Publication DE 29 00 295 C2 discloses an angular measuring apparatus wherein the transparent areas of the index disk which are remote from the illumination source are larger than the transparent areas on the index disk which are closer to the illumination source. The objective of such an arrangement is to allow the largest amount of light energy possible to strike the photo detectors.

It has been shown that with systems of this type, the amount of light received by the detectors depends upon the distance of the individual index disks from one another and the distance of the individual index disks from the illumination source. Furthermore, the phase relationships of the detected signals are undefined with respect to illumination sources which emit diverging or converging beams of light. In addition, a reduction in the scanning distance between the illumination source and index disk results in an increase in the light energy detected and thus to an increase in signal amplitudes at the output of the detectors. This may result in saturation of the downstream electronic evaluation unit and thus should be avoided.

SUMMARY OF THE INVENTION

According to an aspect of the invention, a measuring system is provided having a rotatable index disk, a scanning unit, a light source and a plurality of detectors. The rotatable index disk is located in an index plane and has a scale formed by index lines radially extending along a surface of the index disk. The length of each index line is limited by masked areas. The scanning unit is positioned in front of the index disk and is located in a scanning plane parallel with the index plane. The scanning unit includes scanning fields for scanning the index lines of the index disk. The separation between the index disk and scanning unit can vary from a minimum separation to a maximum separation. The light source is located in front of the scanning unit and emits beams which are oblique to the index plane but parallel to the index lines. The plurality of detectors is positioned behind the index disk and is located in a detector plane parallel with the index plane. The detectors are illuminated by light modulated by the index disk. The masked areas of the index disk are positioned to compensate for an increase in the illumination of the detectors which would occur when the separation between the scanning unit and index disk is at its minimum.

According to another aspect of the invention, an index disk for use in a position measuring system is provided having a glass body and a plurality of radially extending opaque index lines separated by light transmitting gaps. At least one masked area is provided which limits the length of the index lines.

According to still another aspect of the invention, a measuring system having several gratings displaceable in the measuring direction with relation to one another is provided. The measuring system includes a scanning grating and a scale grating located downstream of the scanning grating. The scale grating has grating lines for modulating light from a light source which impinges upon the scale grating so that the light passes parallelly to the grating lines and obliquely to the plane of the scale grating. At least one detector located downstream of the scale grating converts the modulation of the intensity of the light by the scale grating into electrical signals which are phase-shifted with respect to each other. The length of the grating lines of the scale grating is limited by at least one masked area so that the detector is maximally illuminated when the separation between the scale grating and scanning grating is at its maximally permissible distance.

An object of the present invention is to avoid the above mentioned disadvantages and to provide a position measuring system in which an increase in the signal amplitude caused by a reduction of the scanning distance is compensated for and wherein the phase relationships of the various scanning signals remain constant irrespective of whether a converging or diverging source of illumination is used.

The particular advantages of the present invention lie in that a compensation of the signal amplitudes takes place, phase reversal is unnecessary and different index periods and/or index designs can be present in a scanning head without compromising the compensation of the signal amplitudes. A further advantage lies in that contrast changes do not occur because of the signal amplitude compensation.

The invention itself, together with objects and attendant advantages, will best be understood by reference to the following detailed description taken in conjunction with accompanying drawings. It should be understood, however, that this description is to be illustrative rather than limiting the scope of the invention being defined by the appended claims and equivalents thereof.

DETAILED DESCRIPTION OF THE PRESENTLY PREFERRED EMBODIMENTS

Figure 2:
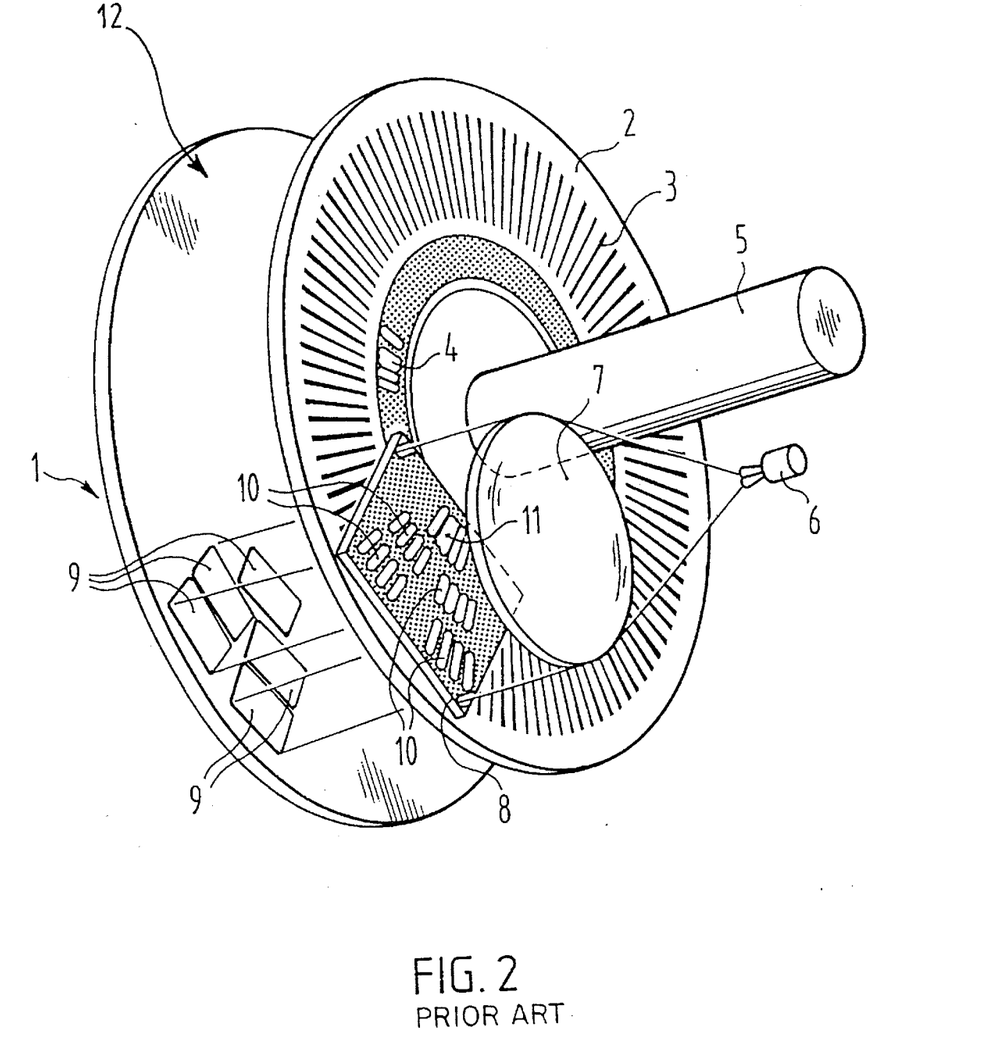
FIG. 2 illustrates a conventional, prior art measuring system in the form of an angular measuring device.

FIG. 2 illustrates a conventional, prior art measuring system in the form of an angular measuring device. Such an angular measuring system, also referred to as an incremental shaft encoder, operates by photoelectrically scanning fine gratings. Incremental shaft encoder 1 includes an index disk 2, a scanning unit 8, photo elements or detectors 9, a light source 6 and a condenser 7. The index disk 2 is mounted on a shaft 5 and the index disk 2 and shaft 5 rotate as a unit. The light source 6, condenser 7, scanning unit 8 and photo elements 9 do not rotate with respect to the index disk 2. Preferably, the photo elements 9 are mounted on a stationary disk 12. The scanning unit 8, condenser 7 and light source 6 are mounted on an element (not shown) which is fixed to the stationary disk 12.

The index disk 2 is preferably made of glass and has a radial grating 3 formed thereon so that the index disk 2 forms a measurement representation. In a preferred embodiment, the grating consists of a plurality of opaque index lines separated by light transmissive gaps. Because the encoder is an incremental type, the index lines are approximately as wide as the light transmissive gaps and the spacing between the index lines is equidistant. The index lines are preferably formed of chromium which is applied to the glass body of index disk 2 by vacuum evaporation. A second track having a reference mark 4 is also provided on the index disk 2. The reference mark 4 is formed by a plurality of light transmissive or transparent lines on an opaque background.

The scanning unit 8 is disposed a short distance from the index disk 2 and does not rotate with respect to the disk 2. The scanning unit 8 preferably has four scanning fields 10 for scanning the radial grating 3. Each scanning field 10 includes a plurality of light transmissive lines separated from each other by opaque regions. The spacing between the light transmissive lines of the scanning unit 8 is the same as the spacing between the index lines of radial grating 3. A scanning field 11 is also provided for scanning the reference mark 4 on the second track of disk 2.

The light source 6 which is preferably a light emitting diode (LED) or a miniature lamp, illuminates the scanning fields 10 and 11 of the scanning unit 8 through condenser 7 with parallelly oriented light beams. When the index disk 2 rotates, the light beams are modulated and the modulation of the intensity of the light beams are detected by silicon photo elements 9. The photo elements 9 are connected in such a way that they provide two approximately sinusoidal-shaped electrical signals derived from the radial grating 3 and a signal peak derived from reference mark 4 providing the reference mark signal. The four scanning fields 10 of the scanning plate which scan the radial grating 3 are respectively offset with respect to each other by a quarter of the index period, i.e. a quarter of the distance between two index lines.

Figure 1:
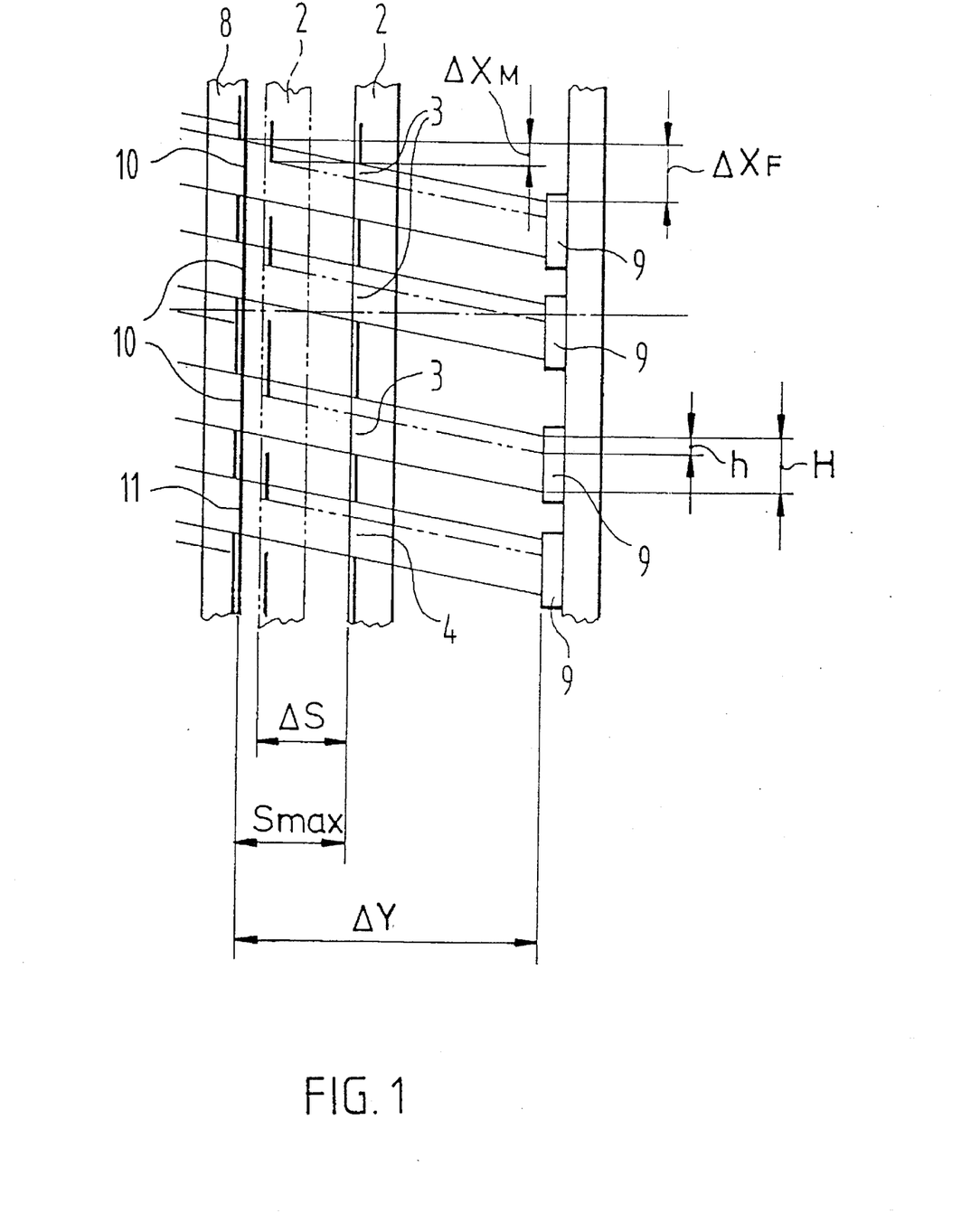
FIG. 1 is a cross-sectional view of a portion of a measuring system according to a preferred embodiment of the present invention.

FIG. 1 is a cross-sectional view of a portion of a measuring system according to a preferred embodiment of the present invention. The same reference numerals are used to identify elements similar to those already discussed with reference to FIG. 2, however, the configuration of those elements is very different. The index disk 2 has a radial grating 3 formed thereon, however, the radial grating 3 differs from that illustrated in FIG. 2 as will become clear hereinafter. A reference mark 4 is also provided on disk 2. See FIG. 3B A scanning unit 8 having scanning fields 10 and 11 for scanning the radial grating 3 and reference mark 4 respectively is provided along with photo elements 9. As was true of the measuring device shown in FIG. 2, the index disk 2 shown in FIG. 1 is rotatable with respect to the scanning unit 8 and photo elements 9. The scanning unit 8, index disk 2 and photo elements 9 have index planes that are parallel to one another. The index planes are the planes in which the index lines of the scale grating 3 and 4 and the scanning grating 10 and 11 are located. The index lines of radial grating 3, reference mark 4 and scanning fields 10 and 11 extend from top to bottom parallel to the drawing plane.

Collimated beams of light from a light source (not shown) impinge upon these planes obliquely as illustrated by the parallel lines passing through the index planes of the scanning unit 8, index disk 2 and photo detectors 9. In order to maintain the phase relationship of the detected signals, the light beams must not only obliquely strike the index planes of the scale grating 3 and 4 and the scanning grating 10 and 11, they must also extend parallel to the orientation of the index lines (see FIG. 3C). In addition, the length of the index lines of the grating 3 of the scale as well as those of the scanning unit must be limited as will be discussed hereinafter with reference to FIGS. 3–5.

Figure 3A:
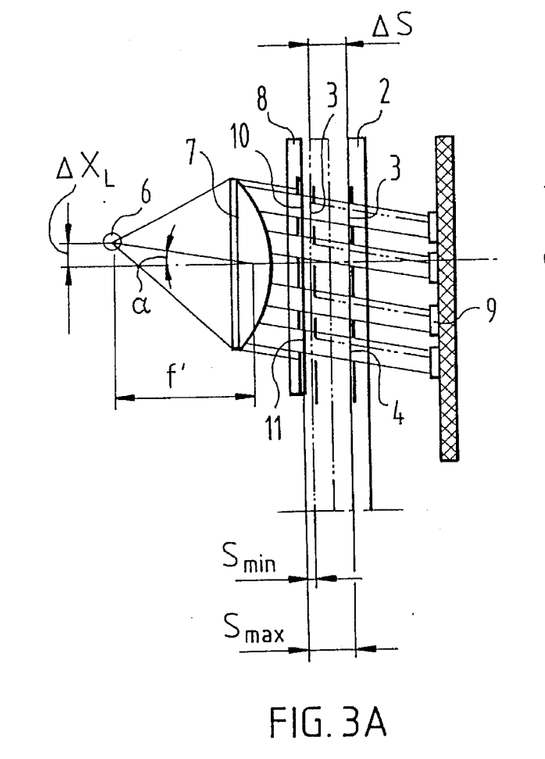
FIG. 3A is a side cross-sectional view of a position measuring system according to a preferred embodiment of the present invention.
Figure 3B:
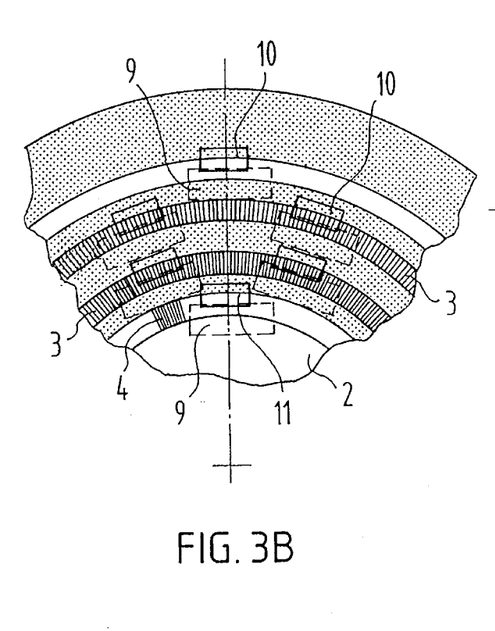
FIG. 3B illustrates a partial front view of the measuring system shown in FIG. 3A.
Figure 3C:
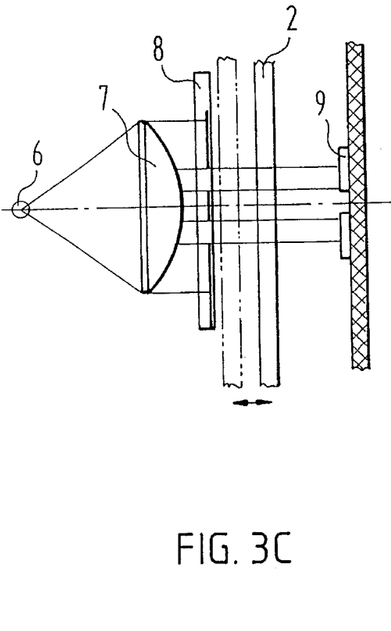
FIG. 3C illustrates a top view of the measuring system shown in FIGS. 3A and 3B.

FIG. 3A is a side cross-sectional view of a position measuring system according to a preferred embodiment of the present invention. FIG. 3B illustrates a partial front view of the measuring system shown in FIG. 3A. FIG. 3C illustrates a top view of the measuring system shown in FIGS. 3A and 3B. Unlike the index lines of the conventional measuring system shown in FIG. 2 which consist of one group of index lines that extends continuously along the surface of the index disks the index lines of the index grating 3 shown in FIG. 3B do not extend continuously along the surface of the index disk. Instead, the index grating 3 includes groups of index lines 3 that are separated from one another by tracks that are absent of any index lines. These tracks act as masked areas and are illustrated by dots in FIG. 3B. The effect of the masked areas on the index disk 2 is to limit the length of the index lines 3. In a preferred embodiment, the masked areas form annular rings on the surface of the disk 2. The index grating 3 is consists of a plurality of opaque lines separated by light transmissive gaps. In a preferred embodiment, the index grating 3 is incremental and thus the width of the opaque lines and light transmissive gaps are substantially equal. A reference mark is also provided on another track on the index disk 2.

With reference to FIGS. 3A and 3C, the index disk 2 is represented in two different positions which are separated from each other by a distance delta S ($\Delta S$). The position of the index disk 2 at its maximum scanning distance $S_{max}$ from the scanning grating 8 is shown in solid line, while the position of the index disk 2 at its minimum scanning distance $S_{min}$ is shown in dotted line. Normally, in a conventional system such as that shown in FIG. 2, the photo detectors would receive maximum illumination when the index disk 2 is located at position $S_{min}$ since at that position, the disk 2 is closest to the light source 6. In the present invention, the photodetector 9 do not receive maximum illumination when the index disk 2 is at position $S_{min}$ because a portion of the illuminating beams are screened by the previously mentioned masked areas so that the detectors 9 receive less light than they normally would. This screening compensates for the higher intensity occurring by reason of the approach of the index disk 2 to the illumination source 6 and condenser 7. Instead, the detectors 9 are instead maximally illuminated when the index disk 2 is at its maximum scanning distance $S_{max}$ or rather its furthest distance from the light source 6.

In this preferred embodiment, the light source 6 is disposed in the focal plane of the condenser 7, however, it is displaced by a distance $\Delta X_L$ with respect to the optical axis. The optical axis extends perpendicularly, as shown, through the index planes of the scanning unit 8, index disk 2 and photo detectors 9. Such an arrangement produces parallel beams which are inclined at an angle $\alpha$ with respect to the optical axis as illustrated. Angle $\alpha$ can be defined by equation (1) below:

$$\alpha = \arctan \frac{\Delta X_L}{f}, \tag{1}$$

where f is the focal length of condenser 7.

The scanning fields 10 and 11 are arranged as required to scan the index grating 3 and reference mark 4. For example, they may be arranged next to each other, underneath each other or crosswise. In addition, the scanning fields 10 and 11 can be divided at a ratio such as 1:1, where the grating lines are as wide as the gaps separating them. Alternatively, they can be divided according to a defined function such as an arcsin function.

The length of the index lines on the grating index 3 are equal to the length of the scanning lines of the scanning fields, however, they are offset in the vertical direction with relation to each other by an amount $\Delta X_M$ (see FIG. 1). The distance $\Delta X_M$ can be defined by equation (2) below:

$$\Delta X_M = \frac{\Delta X_L}{f} \cdot S_{max}. \tag{2}$$

The symbol "·" in equation (2) and the following equations represents a multiplication operation. The detectors 9 are also offset in the vertical direction with respect to the scanning lines of the scanning grating 8 by an amount $\Delta X_F$ (see FIG. 1). The distance $\Delta X_F$ can be defined by equation (3) below:

$$\Delta X_F = \frac{\Delta X_L}{f} \cdot \Delta Y. \tag{3}$$

Each group of index lines 3 on the disk 2 is separated radially from one another by opaque regions which form the previously described masked areas as shown in FIG. 3B.

With the arrangement described, the maximum illumination of the detectors 9 results when the index disk 2 is located at the distance $S_{max}$ from the scanning grating 8 and not at the distance $S_{min}$ as would occur in a conventional system. When the distance between the index disk 2 and the scanning disk 8 is decreased, the increase in the scanning signal due to the increase in the intensity of the light beams that would occur in a conventional system such as that shown in FIG. 2 is counteracted by the masked areas which screen the light flow from the detectors 9.

The detected signals vary as a function of the distance of the index disk 2 with respect to the scanning grating 8. If this variation is known, i.e., the maximum intensity $I_{max}$ at the minimum distance $S_{min}$ and the minimum intensity $I_{min}$ at the maximum distance $S_{max}$, the amount of deviation of the light source from the optical axis $\Delta X_L$ can be determined by equations (4.1) and (4.2) below:

$$\frac{I_{max}}{I_{min}} = \frac{H}{H-h}. \tag{4.1}$$

$$h = \frac{\Delta X_L}{F} \cdot \Delta S. \tag{4.2}$$

where H is the distance between parallel beams of light and h is the amount of deviation of a beam striking a detector 9 when the index disk is at $S_{min}$ and $S_{max}$.

Solving equations (4.1) and (4.2) for $\Delta X_L$ can be defined by equation (5) below:

$$\Delta X_L = \frac{Hxf}{\Delta S} \cdot \left(1 - \frac{I_{min}}{I_{max}}\right). \tag{5}$$

Figure 4A:
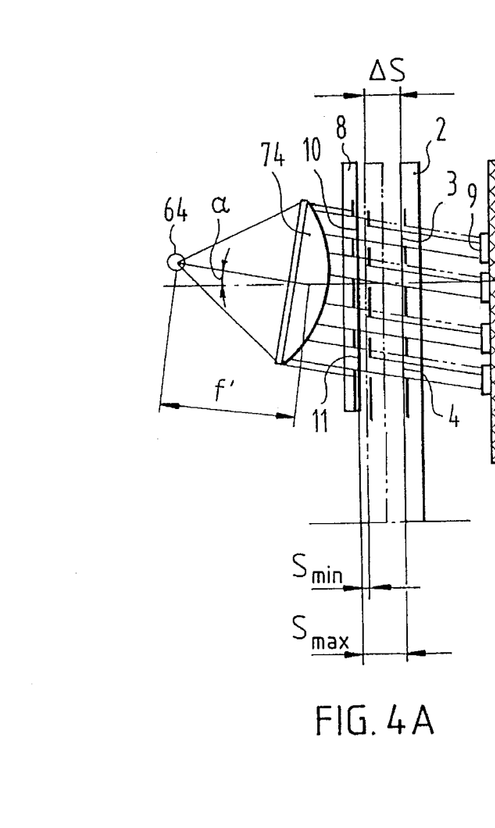
FIG. 4A is a side cross-section view of a position measuring device according to another embodiment of the present invention.
Figure 4B:
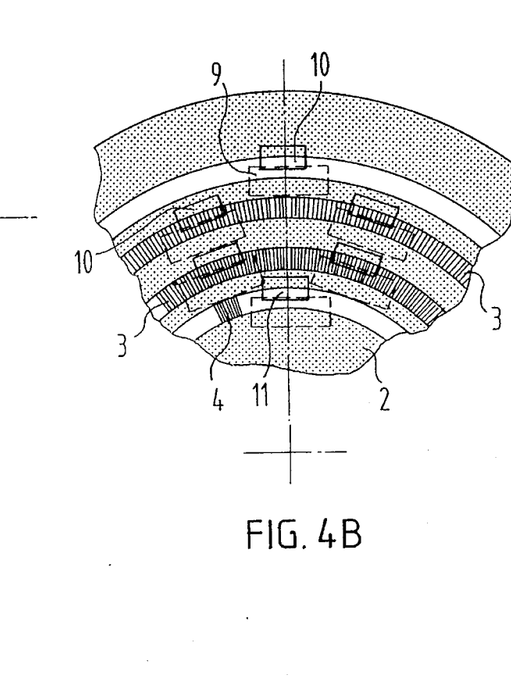
FIG. 4B illustrates a partial front view of the measuring system shown in FIG. 4A.
Figure 4C:
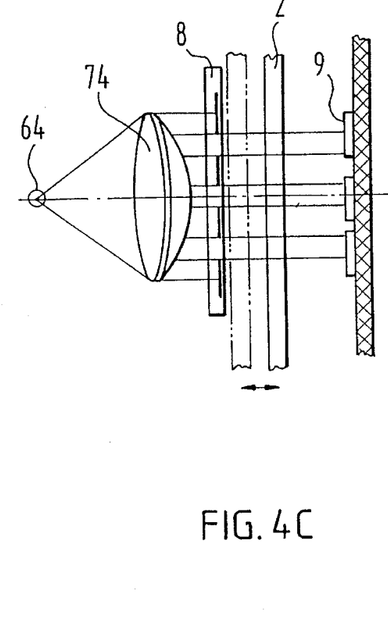
FIG. 4C illustrates a top view of the measuring device shown in FIGS. 4A and 4B.

FIG. 4A is a side cross-sectional view of a position measuring device according to another embodiment of the present invention. FIG. 4B illustrates a partial front view of the measuring system shown in FIG. 4A. FIG. 4C illustrates a top view of the measuring device shown in FIGS. 4A and 4B. In this embodiment, the entire illuminating unit consisting of the light source 6 and condenser 7 is tilted to achieve the oblique illumination of the scanning plate 8, index disk 2 and photodetectors 9. Apart from the tilting of the illumination unit, all other features of the embodiment shown in FIGS. 4A–C are the same as previously discussed with reference to FIGS. 3A–C and thus need not be described in further detail.

Figure 5A:
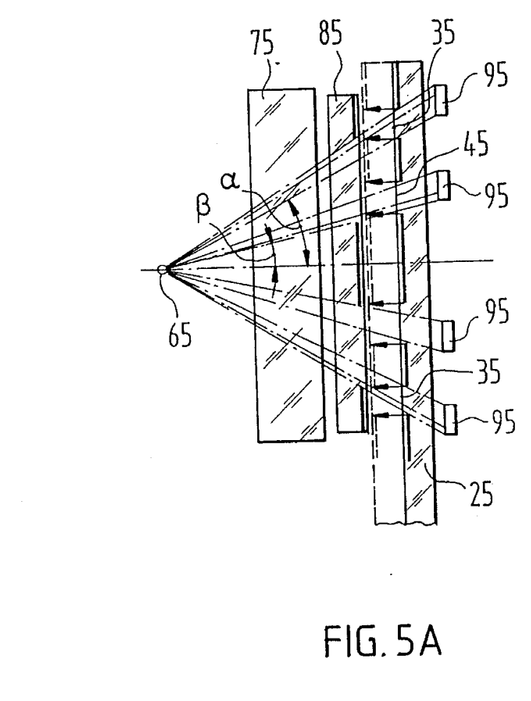
FIG. 5A is a side cross-sectional view of a position measuring system according to still another preferred embodiment of the present invention.
Figure 5B:
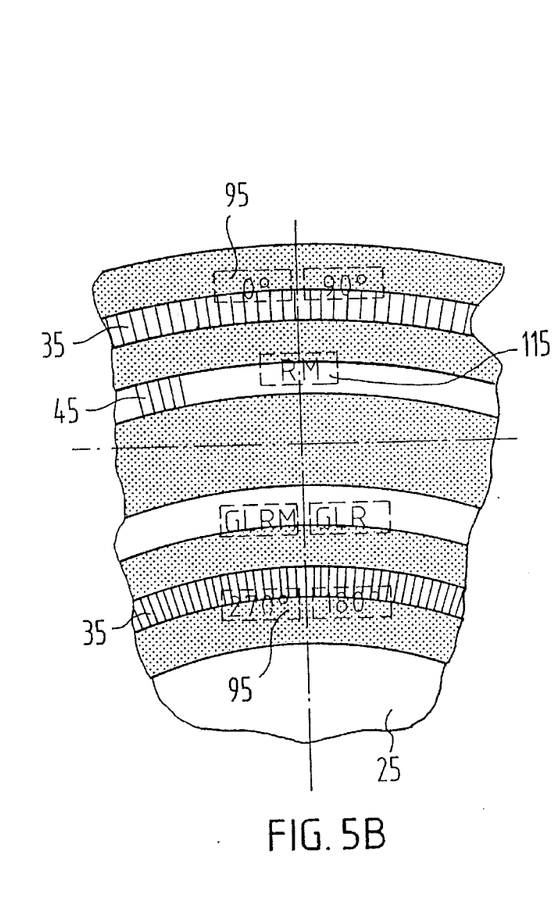
FIG. 5B illustrates a partial front view of the measuring system shown in FIG. 5A.
Figure 5C:
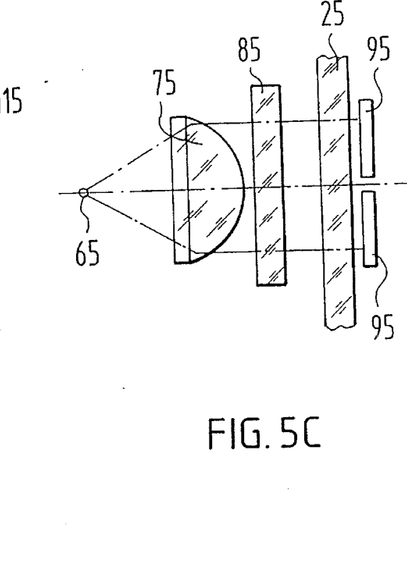
FIG. 5C illustrates a top view of the measuring system shown in FIGS. 5A and 5B.

FIG. 5A is a side cross-sectional view of a positioning measuring system according to still another preferred embodiment of the present invention. FIG. 5B illustrates a partial front view of the measuring system shown in FIG. 5A. FIG. 5C illustrates a top view of the measuring system shown in FIGS. 5A and 5B. Unlike the previously described embodiments which utilize parallel beams that obliquely strike the index planes of the scanning unit 8, index disk 2 and photo detectors 9, the light source shown in FIGS. 5A–C emit beams which are divergent with respect to the optical axis, The beams are, however, parallel in the direction of the grating lines, i.e., in the direction in which the grating lines extend (see FIG. 5C).

The light source 65 is located at the focal point of a cylindrical lens 75 so that parallel beams are generated only in one plane (see FIG. 5C) while in the other plane, the photo elements 95 are illuminated by beams which are at a defined angle with respect to the optical axis. The beams which impinge upon the scanning disk 85, index disk 25 and photo-elements 95 at a defined angle with respect to the optical axis, are limited by masks on the index disk 25 in such a way that the photo elements 95 are maximally illuminated when the index disk 25 is at its greatest distance from the scanning disk 85.

As the distance between the scanning grating 85 and the index disk 25 is reduced, corresponding areas of the photo elements 95 are screened from the partial beams by the masks located on the index disk 25 so that an increase in amplitude which would occur in a conventional system is compensated for.

Different grating constants require different corresponding shading or masked areas on the index disk. The radial distance between the graduation tracks and the optical axis is the determinant for the shielding properties. The grating located further from the optical axis are more strongly shielded as a function of angles $\alpha$ and $\beta$. This is intentionally used for shielding graduations having different grating constants differently. The reference mark 45 has a different grating constant than the index grating 35. Thus, the amplitude compensation provided by the present invention can also be employed for scanning a reference mark is diagonal at a suitable radial distance from the optical axis. The angles α and β are the illumination angles of the various partial beams. The partial beams forming the angle α impact through the graduation 35 on the detectors 95 which generate the 0° signal and the 90° signal. The partial beams of the angle β illuminate the reference marker 45 and the associated detector 115 (see FIG. 5B).

While the preferred embodiments have embodied the invention in an angular measuring system, the invention is not limited to such a system and can be embodied in a linear measuring system.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A measuring system comprising:
   a rotatable index disk located in an index plane having a scale formed by index lines radially extending along a surface of the index disk wherein each index line has a length limited by masked areas;
   a scanning unit positioned in front of the index disk, located in a scanning plane, and having a separation from the index disk, the scanning plate being parallel with the index plane and having scanning fields for scanning the index lines of the index disk, wherein the separation between the index disk and scanning unit can vary from a minimum separation to a maximum separation;
   a light source located in front of the scanning unit wherein the light source emits beams that are oblique to the index plane but parallel to the index lines; and
   a plurality of detectors positioned behind the index disk and located in a detector plane parallel with the index plane wherein the detectors are illuminated by light modulated by the index disk, wherein the masked areas of the index disk are positioned to compensate from an increase in the illumination of the detectors which would occur when the separation between the scanning unit and index disk is at its minimum.

2. A measuring system according to claim 1 further comprising a lens positioned between the light source and the scanning unit wherein the light source is located at a focal point of the lens.

3. A measuring system according to claim 2 wherein the light source is displaced from an optical axis which is perpendicular to the index plane.

4. A measuring system according to claim 2 wherein the lens and light source are inclined with respect to an optical axis which is perpendicular to the index plane.

5. A measuring system according to claim 2 wherein the beams emitted by the light source are inclined at an angle α with respect to an optical axis which is perpendicular to the index plane, the angle α being defined by the equation $$\alpha = \arctan \frac{\Delta X_L}{f}$$

where $\Delta X_L$ is a distance the light source is displaced from the optical axis and f is the focal length of the lens.

6. A position measuring system according to claim 2 wherein the scanning fields of the scanning unit are offset with respect to the index lines of the index disk by a distance $\Delta X_M$, where $\Delta X_M$ is defined by the equation:

$$\Delta X_M = \frac{\Delta X_L}{f} \cdot S_{MAX}$$

where $\Delta X_L$ is a distance the light source is displaced from an optical axis, f is a focal length of the lens and $S_{MAX}$ is the maximum separation between the scanning unit and the index disk.

7. A position measuring system according to claim 6 wherein the detectors are offset with respect to the scanning fields of the scanning unit by a distance $\Delta X_F$, where $\Delta X_F$ is defined by the equation:

$$\Delta X_F = \frac{\Delta X_L}{f} \cdot \Delta Y,$$

where $\Delta Y$ is a distance separating the scanning unit and the plurality of detectors.

8. A measuring system according to claim 1 wherein the masked areas are opaque.

9. A measuring system according to claim 1 wherein the masked areas are annular regions.

10. A measuring system according to claim 1 further including a reference mark located on the index disk.

11. A measuring system according to claim 1 wherein the masked areas of the index disk have a position which provide maximum illumination of the detectors when the separation between the scanning unit and index disk is at its maximum.

12. A measuring system according to claim 1 wherein the light source emits divergent beams of light.

13. A measuring system having several gratings displaceable in a measuring direction with relation to one another comprising:
   a scanning grating;
   a scale grating located downstream of the scanning grating, the scale grating having grating lines for modulating light from a light source which impinges upon the scale grating wherein the light passes parallely to the grating lines and obliquely to a plane of the scale grating;
   at least one detector downstream of the scale grating, the detector converting the modulation of intensity of the light by the scale grating into electrical signals which are phase-shifted with respect to each other; and
   wherein the grating lines of the scale grating have a length limited by at least one masked area so that the detector is maximally illuminated when the scale grating and scanning grating are separated at its maximally permissible distance.

14. A measuring system according to claim 13 wherein the masked area is an annular ring.

* * * * *

UNITED STATES PATENT AND TRADEMARK OFFICE
CERTIFICATE OF CORRECTION

PATENT NO. : 5,493,399
DATED : February 20, 1996
INVENTOR(S) : Hermann Meyer et al.

It is certified that error appears in the above-indentified patent and that said Letters Patent is hereby corrected as shown below:

<u>On the Title Page</u>

In column 1, line 1 of the "Assignee" insert --Dr.-- immediately after "Assignee:".

In column 1, line 1 under "Foreign Application Priority Data" delete "93111500" and substitute --93111500.0--.

In column 2, line 5 under "FOREIGN PATENT DOCUMENTS" delete "2246431" and substitute --GB 2246431--.

Column 7,

In claim 5 delete "$\alpha = \arctan \frac{\Delta X_L}{f}$" and substitute --$\alpha = \arctan \frac{\Delta X_L}{f'}$--.

Column 8,

In claim 6 delete "$\Delta X_M = \frac{\Delta X_L}{f} \cdot S_{MAX}$" and substitute --$\Delta X_M = \frac{\Delta X_L}{f'} \cdot S_{MAX}$--.

UNITED STATES PATENT AND TRADEMARK OFFICE
CERTIFICATE OF CORRECTION

PATENT NO. : 5,493,399
DATED : February 20, 1996
INVENTOR(S) : Hermann Meyer, et. al.

It is certified that error appears in the above-indentified patent and that said Letters Patent is hereby corrected as shown below:

Column 8,

In claim 7 delete "$\Delta X_F = \frac{\Delta X_L}{f} \cdot \Delta Y,$" and substitute -- $\Delta X_F = \frac{\Delta X_L}{f'} \cdot \Delta Y,$ --.

Signed and Sealed this

Nineteenth Day of November, 1996

Attest:

BRUCE LEHMAN

Attesting Officer     Commissioner of Patents and Trademarks